US008650303B1

(12) United States Patent
Lang et al.

(10) Patent No.: US 8,650,303 B1
(45) Date of Patent: Feb. 11, 2014

(54) DATA MANAGEMENT FOR AN APPLICATION WITH MULTIPLE OPERATION MODES

(71) Applicant: Citrix Sytems, Inc., Fort Lauderdale, FL (US)

(72) Inventors: Zhongmin Lang, Parkland, FL (US); Gary Barton, Boca Raton, FL (US); Nitin Desai, Coral Springs, FL (US); James R. Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/022,845

(22) Filed: Sep. 10, 2013

Related U.S. Application Data

(63) Continuation of application No. 14/021,227, filed on Sep. 9, 2013, which is a continuation-in-part of application No. 13/886,889, filed on May 3, 2013.

(60) Provisional application No. 61/806,577, filed on Mar. 29, 2013, provisional application No. 61/861,758, filed on Aug. 2, 2013, provisional application No. 61/861,736, filed on Aug. 2, 2013.

(51) Int. Cl.
*G06F 15/173* (2006.01)

(52) U.S. Cl.
USPC .................................. 709/226; 726/11

(58) Field of Classification Search
USPC .................................. 709/226; 726/11
See application file for complete search history.

(56) References Cited

U.S. PATENT DOCUMENTS

| 6,154,172 | A | 11/2000 | Piccionelli et al. |
| 7,526,800 | B2 * | 4/2009 | Wright et al. ................... 726/11 |
| 2006/0094400 | A1 * | 5/2006 | Beachem et al. ............ 455/410 |
| 2006/0120526 | A1 * | 6/2006 | Boucher et al. ............... 380/247 |
| 2012/0052954 | A1 | 3/2012 | Zhu et al. |
| 2012/0198570 | A1 | 8/2012 | Joa et al. |

* cited by examiner

*Primary Examiner* — Asghar Bilgrami
(74) *Attorney, Agent, or Firm* — Banner & Witcoff, Ltd.

(57) ABSTRACT

A method and system for managing an application with multiple modes are described. A device manager that manages a mobile device may monitor the mobile device. The device manager may detect that a first type of application that runs in a managed mode (or in multiple managed modes) and an unmanaged mode is installed on the mobile device. When the application is executed on the device, the application executes in accordance with the selected application mode, e.g., based on location, user, role, industry presence, or other predefined context.

17 Claims, 14 Drawing Sheets

DATA MANAGEMENT FOR AN APPLICATION WITH MULTIPLE OPERATION MODES

CROSS-REFERENCE TO RELATED APPLICATIONS

This application is a Continuation application of non-provisional application 14/021,227, filed Sep. 9, 2013, entitled "Data Management for an Application with Multiple Operation Modes," which claims priority to provisional application 61/861,736, filed Aug. 2, 2013, entitled "Policy-Based Application Management," provisional application 61/861,758, filed Aug. 2, 2013, entitled "Data Management for an Application with Multiple Operation Modes," and provisional application 61/806,577, filed Mar. 29, 2013, entitled "Systems and Methods for Enterprise Mobility Management," and is a continuation-in-part of U.S. patent application Ser. No. 13/886,889, filed May 3, 2013, entitled "Application with Multiple Operation Modes," each of which is herein incorporated by reference in its entirety.

BACKGROUND

The use of mobile computing devices continues to grow. In particular, business and other enterprises have come to rely on mobile computing devices to allow individuals to remotely access various enterprise resources. Such resources may include, for example, electronic mail services, file services, data, and other electronic resources provided by the computer systems of an enterprise.

With this insurgence of business use, individuals are beginning to use their mobile computing devices in both business and personal ways. For example, an employee of a corporation may access a corporate email account and a personal email account from the same mobile computing device. Accordingly, certain functionality of a mobile computing device may share business and personal aspects. However, business information often requires secure communication and storage. Additionally, business information stored on a mobile device may require management. Thus, there is a need for a device manager to manage information stored on a mobile device.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A method and system for managing an application with multiple operation modes are described herein. A device manager that manages a mobile device may monitor the mobile device. The device manager may detect that a predetermined type of application that runs in an unmanaged mode and a managed mode is installed on the mobile device. The operation mode may be based on a device context or device-related information. For example, the application may run in a first, managed, mode when user credentials authenticate a user as a trusted user, and the application may otherwise run in a second less-secure mode. Operational mode may also be selected based on a physical location of the device, a network location, user credentials, user roles, location types (e.g., healthcare, financial institution premises, schools, government entities, etc., also referred to as workplace environment types), and the like. An application may be executable in more than two operation modes, and may be executable in multiple different managed modes providing different levels of access, security, resources, etc.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices, specifically as used with applications capable of executing in multiple operational modes. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and are not attempting to circumvent the security mechanisms used to protect those enterprise resources. As a result, individuals associated with the enterprise may advantageously utilize enterprise resources at their personal mobile devices using preapproved applications.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
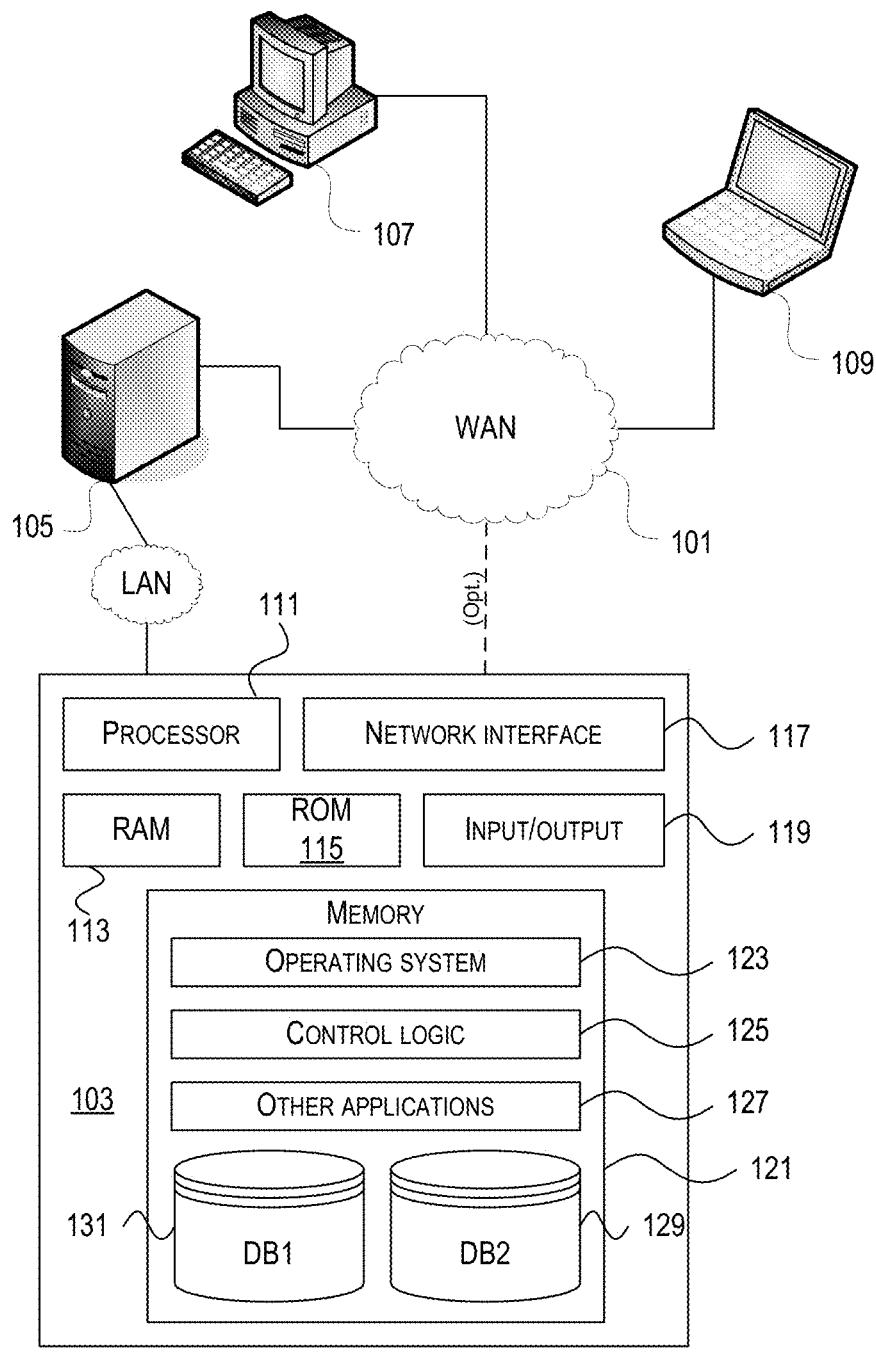
FIG. 1 depicts an illustrative computer system architecture that may be used in accordance with an illustrative embodiment.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
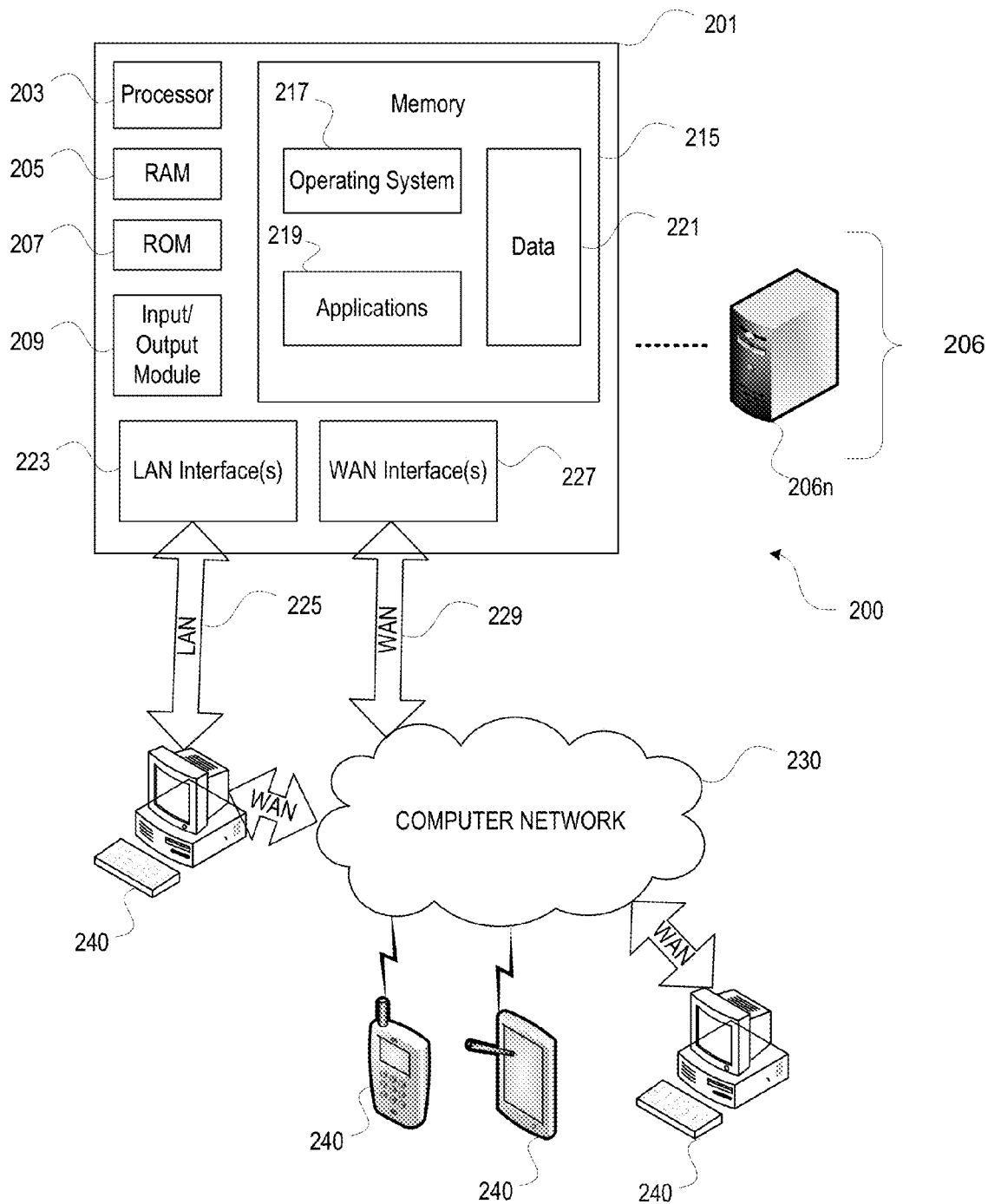
FIG. 2 depicts an illustrative remote-access system architecture that may be used in accordance with an illustrative embodiment.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
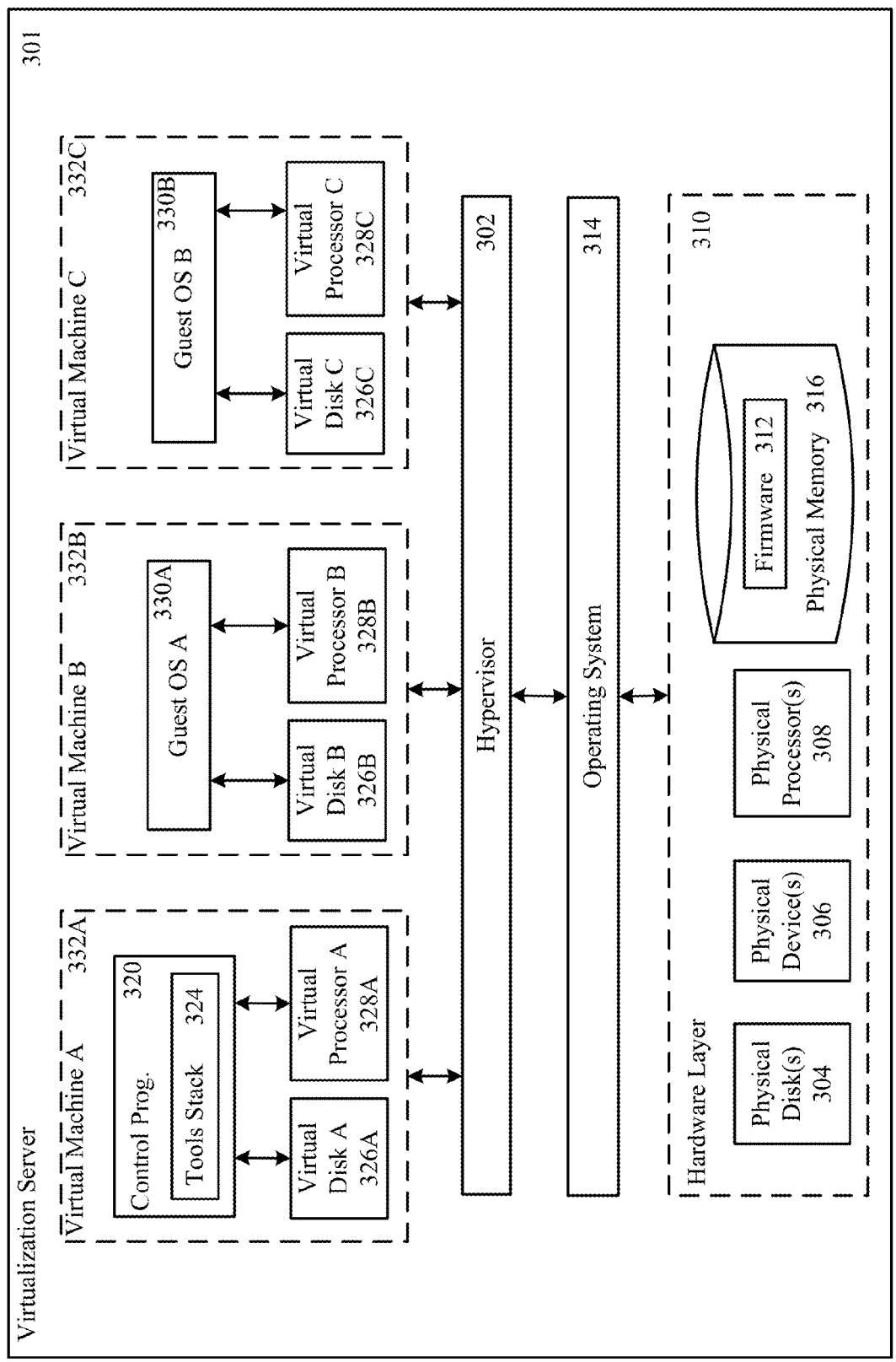
FIG. 3 depicts an illustrative virtualized (hypervisor) system architecture that may be used in accordance with an illustrative embodiment.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
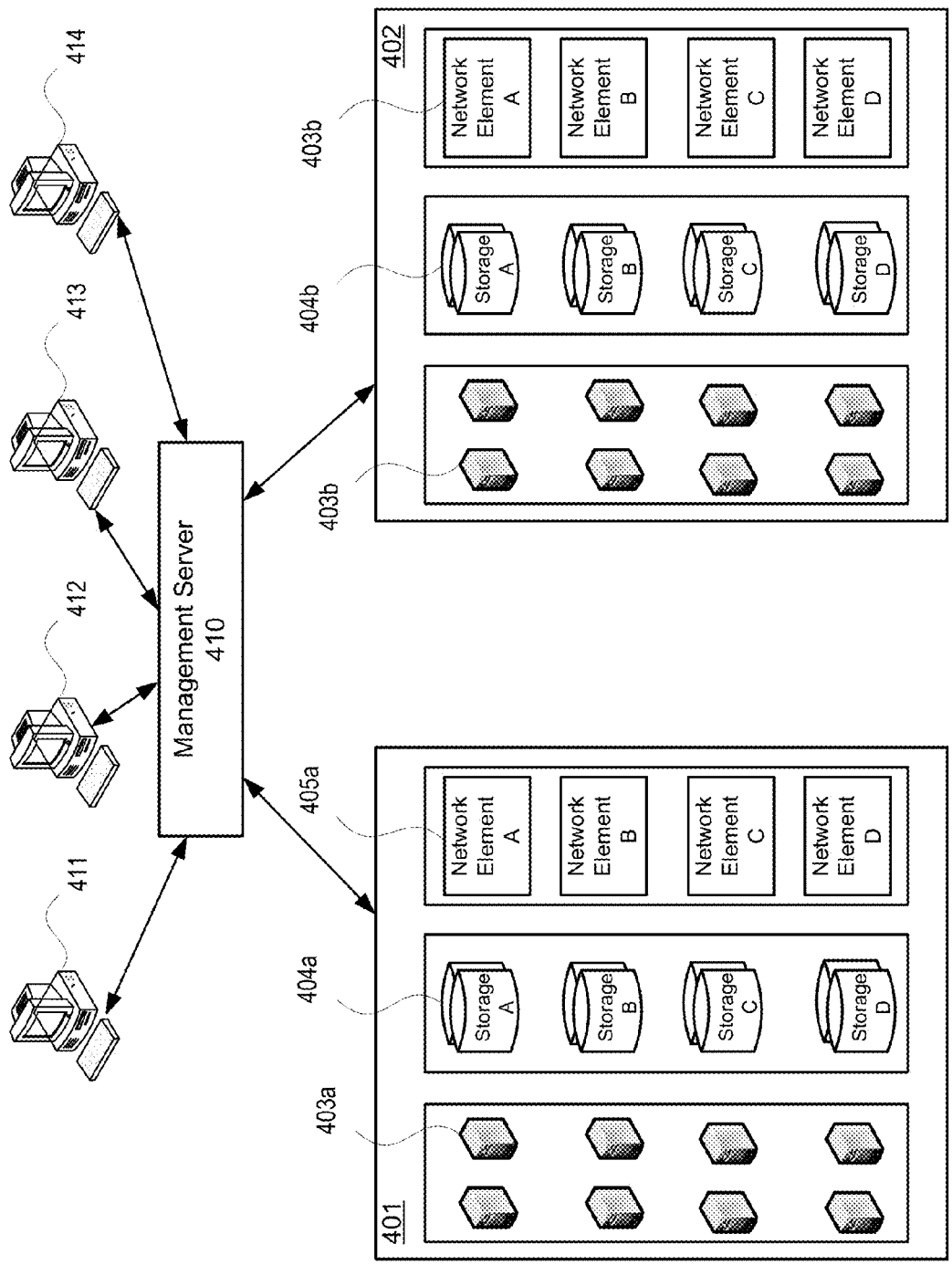
FIG. 4 depicts an illustrative cloud-based system architecture that may be used in accordance with an illustrative embodiment.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
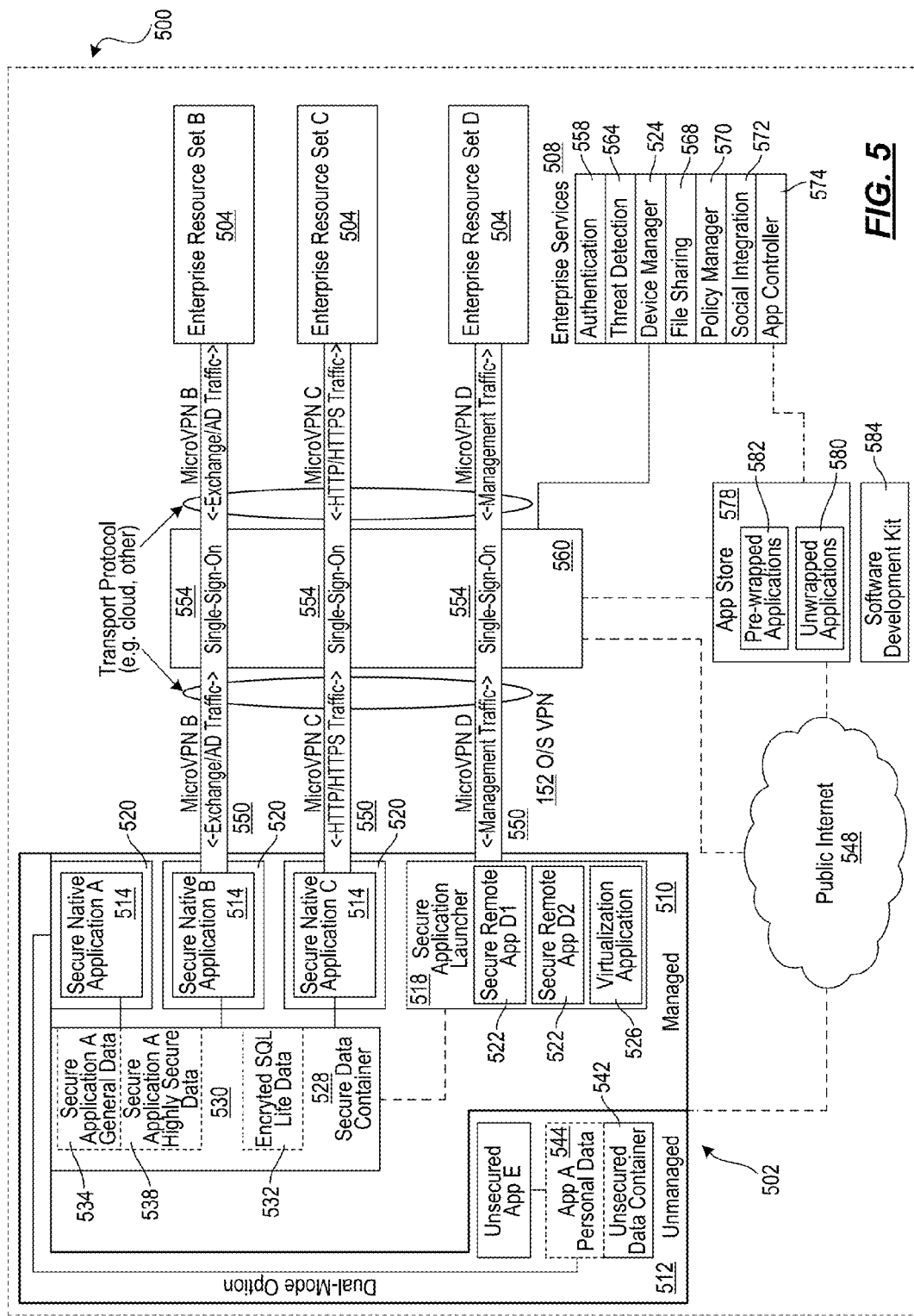
FIG. 5 depicts an illustrative enterprise mobility management system that may be used in accordance with an illustrative embodiment.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as a managed device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record/pass-through user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
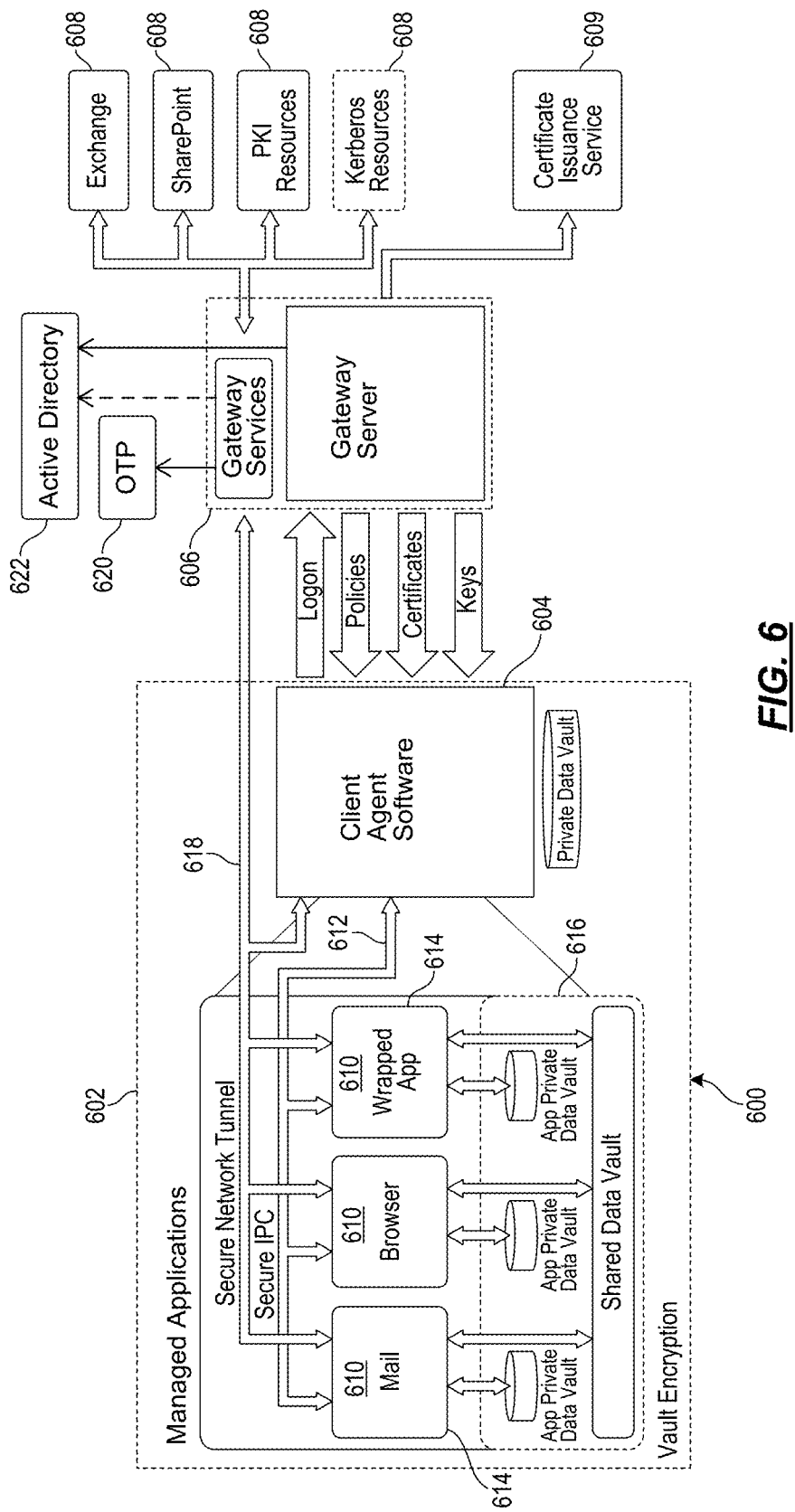
FIG. 6 depicts another illustrative enterprise mobility management system that may be used in accordance with an illustrative embodiment.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents a managed mobile device 602 with a client agent 604, which interacts with gateway server 606 (which includes Access Gateway and App Controller functionality) to access various enterprise resources 608 and services 609 such as Exchange, Sharepoint, PKI Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the HDX/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key Derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application such as @WorkMail may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a PKCS 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP Negotiate authentication challenges. The limited support feature relates to constrained delegation in AFEE, where AFEE supports invoking Kerberos protocol transition so it can obtain and use Kerberos service tickets (subject to constrained delegation) in response to HTTP Negotiate authentication challenges. This mechanism works in reverse web proxy (aka CVPN) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of StoreFront and App Controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiment(s)

Figure 7:
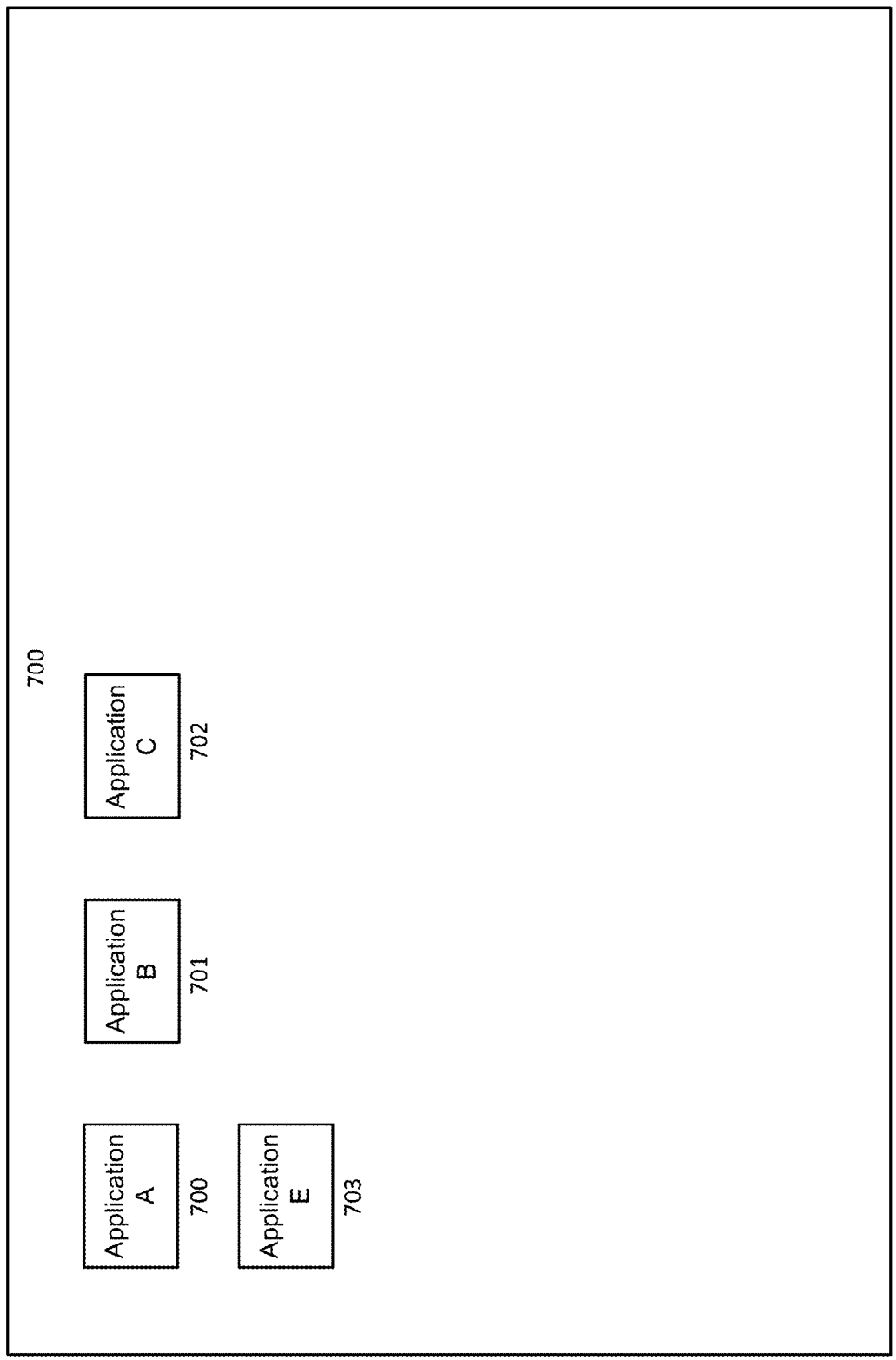
FIG. 7 depicts a sample interface of a mobile device in accordance with an illustrative embodiment.

FIG. 7 illustrates a sample interface of a mobile device, and FIGS. 8-14 illustrate sample embodiments of methods for determining an operation mode for an application. The methods depicted in FIGS. 8-14 may be combined in any suitable manner in various embodiments. The sample interface depictured in FIG. 7 may be displayed on a mobile device, such as device 107, 109, 240, 502, and/or 602, and the methods depicted in FIGS. 8-14 may be implemented by such a mobile device.

Figure 8:
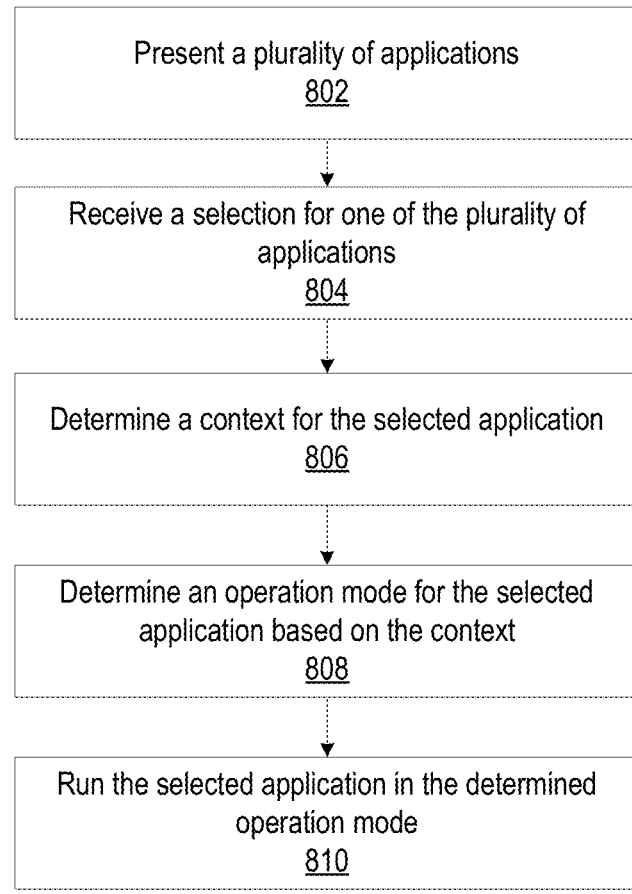
FIG. 8 is a flowchart for determining an application mode for an application in accordance with an illustrative embodiment.

In FIG. 8, a flowchart of example method steps for determining an application mode for an application is shown. The method of FIG. 8 may begin at step 802, where a plurality of applications are presented. For example, a plurality of applications may be presented to a user on a mobile device. FIG. 7 illustrates an embodiment where user interface 700 displayed on a mobile device (e.g., tablet, smart phone, or the like) presents Applications A 700, B 701, C 702, and E 703 to a user. This is merely an example, and the plurality of applications may be presented in any suitable manner. In an embodiment, the plurality of applications may comprise email applications, web browsing applications, software-as-a-service (SaaS) access applications, and the like.

The method of FIG. 8 may proceed from step 802 to step 804, where a selection for one of the plurality of applications is received. With reference to an embodiment depicted in FIG. 7, a user of a mobile device may select one of the presented applications by, for example, pressing a display of the mobile device to select the application. This is merely an example, and the application may be selected in any suitable manner.

The method of FIG. 8 may proceed from step 804 to step 806, where a context for the selected applications is determined based on one or more operational parameters of the device executing the selected application. For example, a context may be based on an account to be accessed by the application, a location of the mobile device or a network connectivity status of the mobile device executing the application, or based on any other operational parameter. The methods of FIGS. 9-13, further described below, illustrate various embodiments where example contexts are described.

The method of FIG. 8 may proceed from step 804 to step 806, where an operation mode for the selected application is determined based on the context. In an embodiment, the operations modes may comprise managed and unmanaged modes, e.g., representing work and non-work modes of a device for when a user is performing employment-related versus personal activities, respectively. The work mode may provide access to enterprise resources and include one or more content filters and/or restrictions, whereas the non-work mode might apply policies (or no policies) and/or content filters/restrictions (or none) that allow access to only non-enterprise related resources.

In addition, there may be multiple different managed modes, e.g., based on different security levels of various users or sets of credentials provided by a user, different user roles identified by a set of credentials (e.g., manager versus staff employees), geographic locations from which the device is operated, network locations, operational environment (e.g., a healthcare-related managed mode versus a financial industry managed mode), or based on any other contextual determination. Some modes may be based on multiple contexts, e.g., location and role. In one such combination a first managed mode may provide applicable policies for a healthcare provider, whereas a second managed mode may apply applicable policies for a patient. As a device is passed between the two users, the user (or software based on user action) may initiate a change of mode as the device is passed to a user having a different role. The new user may be required to enter appropriate credentials to change modes, e.g., when changing to a more secure mode. The healthcare provider mode may provide access to a wide array of patient records, resources, scheduling details, financial records, and other information, whereas a patient mode may be limited to only that patient's information, e.g., based on HIPPA and other privacy considerations. Other combinations of contextual decisions may also be used.

In an embodiment, the determined context may be compared to a stored policy in order to determine an operation mode. A mobile device, such as mobile device 502, may store one or more policies used to determine an operation mode for an application. In an embodiment, the policies may be stored remotely, such as at policy manager 570, described above with reference to FIG. 5, or may be stored locally on the device. In an example, a context may comprise a selected application configured to access a secure account, such as an email application configured to access a secure email account. This context may be compared to a stored policy. For instance, the stored policy may define that an email application that is configured to access a secure email account is to be run as a managed application. The stored policy may further indicate that the email application, when configured to access a personal account of the device user, may operate in an unmanaged mode. Additional contexts and policies will be described with respect to FIGS. 9-13.

The method of FIG. 8 may proceed from step 806 to step 808, where the selected application is run in the determined operation mode. For example, the operation mode may be determined as unmanaged, or as one of multiple managed modes, and the selected application may be run in the determined mode.

In an embodiment, a managed operation mode may include running the application as a part of the managed partition 510 of mobile device 502, as described above with reference to FIG. 5. As such, the managed application may be run as secure native applications 514, secure remote applications 522 executed by a secure application launcher 518, virtualization applications 526 executed by a secure application launcher 518, and the like.

In an embodiment, an application running in managed mode may access data stored in a secure data container 528 in the managed partition 510 (physical, logical, or virtual) of the mobile device. The data stored in the secure data container 528 may include data restricted to a specific secure/managed application 530, shared among other secure/managed applications, and the like. Data restricted to a secure application may include secure general data 534 and highly secure data 538. Different levels and types of security features may be used to differentiate levels of secure data. In an embodiment, an application running in managed mode may save, modify, or delete data in secure data container 528. The data saved or modified may be encrypted similar to other data stored in secure data container 528.

In an embodiment, an application running in managed mode may connect to enterprise resources 504 and enterprise services 508 through virtual private network connections, as described about with reference to FIG. 5. The virtual private network connections may be microVPNs, which are specific to a particular application, such as the selected application, particular devices, particular secured areas on the mobile device, and the like. For example, wrapped applications in a secured area of the phone may access enterprise resources through an application specific VPN such that access to the VPN would be granted based on attributes associated with the application, possibly in conjunction with user or device attribute information, and policy information.

In an embodiment, an application running in managed mode may encrypt data transmitted from the application. For example, an application running in managed mode may be communicating with a computing device over a network, and the data transmitted from the application to the device may be encrypted. In addition, the data communicated from the computing device to the application may also be encrypted, and the application running in managed mode may be configured to decrypt the received data.

In an embodiment, an application running in managed mode my access a secure portal. For example, an application may connect to a computing device over a network, for example, a microVPN, and may access a secure portal that might not be access by unsecured applications, such as applications running in unmanaged mode.

In an embodiment, an unmanaged operation mode may include running the application as a part of the unmanaged partition 512 (physical, logical, or virtual) of mobile device 502, as described above with reference to FIG. 5. In an unmanaged mode, the application may access data stored in an unsecured data container 542 on the unmanaged partition 512 of the mobile device 502. The data stored in an unsecured data container may be personal data 544.

In an embodiment, where more than one managed mode is possible, an application running in a less secure managed mode may be run similar to an application running in the more secure managed mode, but might not include all aspects of the latter. For example, an application running in the less secure managed mode may have the information transmitted from the application over a network encrypted, but the application might not have access to secure data container 528, as described with reference to FIG. 5. In another example, an application running in the less secure managed mode may have access to secure data container 528, but might not be able to connect to enterprise resources 504 and enterprise services 508 through virtual private network connections. Accordingly, depending on the determined context, an application running in a less secure managed mode may include aspects of an application running in the more secure managed mode and aspects of an application running in unmanaged mode.

In FIGS. 9-13, flowcharts of example method steps for determining a context and operation mode for an application are shown. In an embodiment, steps 806 and 808 of FIG. 8 may comprise the method steps of any one or more of FIGS. 9-13. The method of FIG. 9 may begin at step 902, where an account to be accessed by a selected application is detected. For example, a selected application may comprise an email application and an email account that the email application is configured to access may be detected. In this example, the email application may be able to access multiple email accounts, such as an enterprise email account and a personal email account, and the account that the email application is configured to access at the time of running may be determined as the context account to be accessed.

Figure 9:
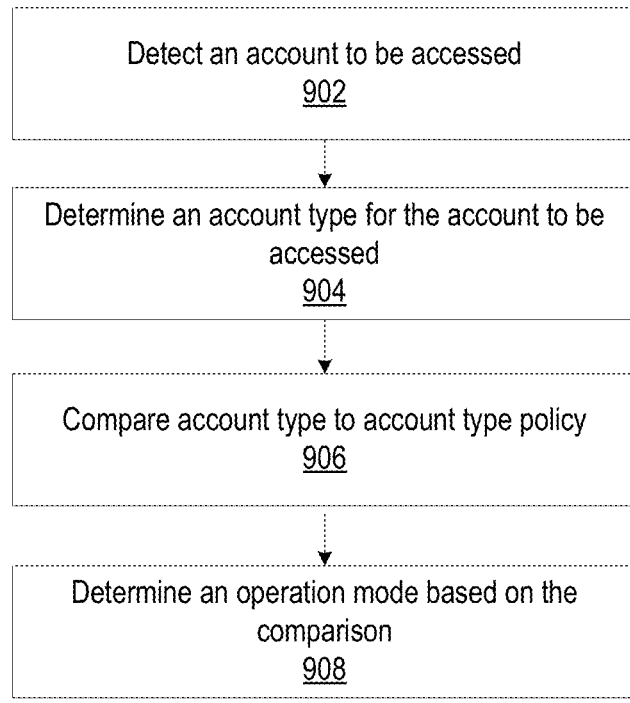
FIG. 9 is a flowchart for determining an account type context for an application in accordance with an illustrative embodiment.

The method of FIG. 9 may proceed from step 902 to step 904, where an account type of the account to be accessed may be determined. The account type may comprise a context for the selected application. For example, a selected application may comprise an email application and the email application may be configured to access an enterprise account. In another example, the email application may be configured to access a personal account.

The method of FIG. 9 may proceed from step 904 to step 906, where an account type may be compared with an account type policy. For example, a policy may define that an email application that is to access an enterprise account should run in managed mode and an email application that is to access a personal account should run in unmanaged mode. The method of FIG. 9 may proceed from step 906 to step 908, where an operation mode is determined based on the comparison.

Figure 10:
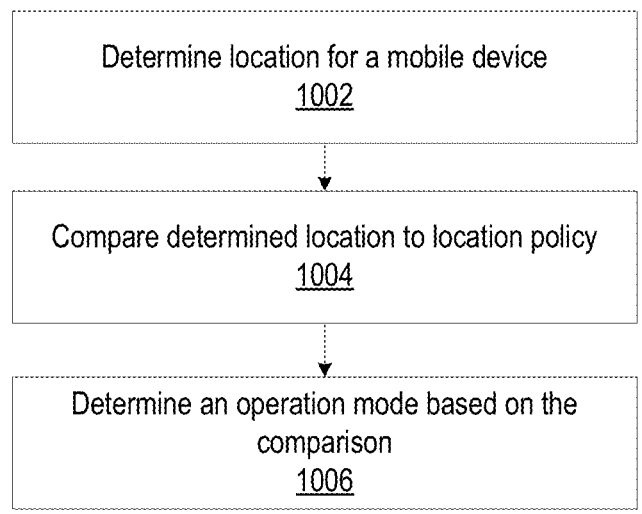
FIG. 10 is a flowchart for determining a location context for an application in accordance with an illustrative embodiment.

The method of FIG. 10 may begin at step 1002, where a location for a mobile device is determined. For example, a mobile device, such as mobile device 502, may implement the method of FIG. 10, and a location for the mobile device may be determined. The location may be determined by GPS, signal triangulation, or any other suitable or otherwise known manner. The location may comprise a context for the selected application.

The method of FIG. 10 may proceed from step 1002 to step 1004, where a determined location may be compared with a location policy. For example, a policy may define that a selected application run in a more secure managed mode when in a certain location, for example, on company premises. In an embodiment, a policy may define that a selected application run in a less secure managed mode when in a certain location, for example, when the determined location is inside the United States but off company premises. For example, the less secure managed mode may encrypt communication to and from the selected application, but might not allow access to enterprise resources, such as resources 504. In another embodiment, a policy may define that a selected application run in unmanaged mode when in a certain location, for example, when the determined location is outside the United States. The method of FIG. 10 may proceed from step 1004 to step 1006, where an operation mode is determined based on the comparison.

Alternatively or in addition to physical location, a network location may also or instead be used to determine whether access is permitted. For example, network location may refer to whether a user is either internal to a data center (or pre-approved Wifi access point), or is external to it. Appropriate access modes may be based on such a determination.

Figure 11:
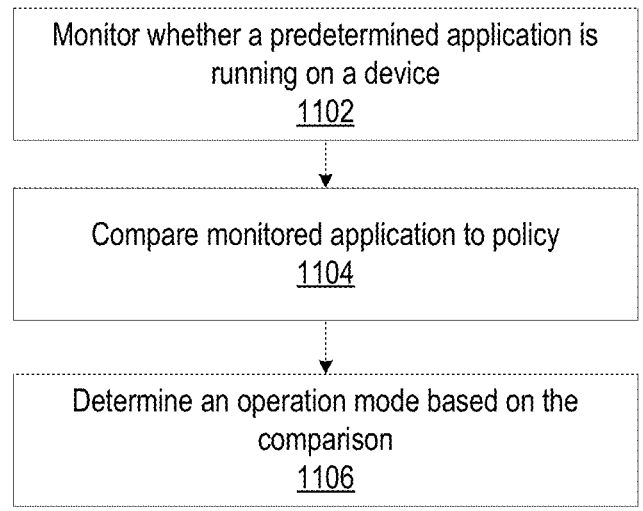
FIG. 11 is a flowchart for determining a predetermine application status context for an application in accordance with an illustrative embodiment.

The method of FIG. 11 may begin at step 1102, where it is monitored whether a predetermined application is running on a device. For example, a mobile device, such as mobile device 502, may implement the method of FIG. 11, and the mobile device may be monitored to determine whether a predetermined application is running. The predetermined application may comprise any application capable of running on the mobile device, such a client agent 604 as described with reference to FIG. 6. The monitored predetermined application may comprise a context for the selected application.

The method of FIG. 11 may proceed from step 1102 to step 1104, where a monitored application is compared against a policy. For example, a policy may define that a selected application run in managed mode when a predetermined application, such as client agent 604, is running and that the selected application run in unmanaged mode when the predetermined application is not running. The method of FIG. 11 may proceed from step 1104 to step 1106, where an operation mode is determined based on the comparison.

Figure 12:
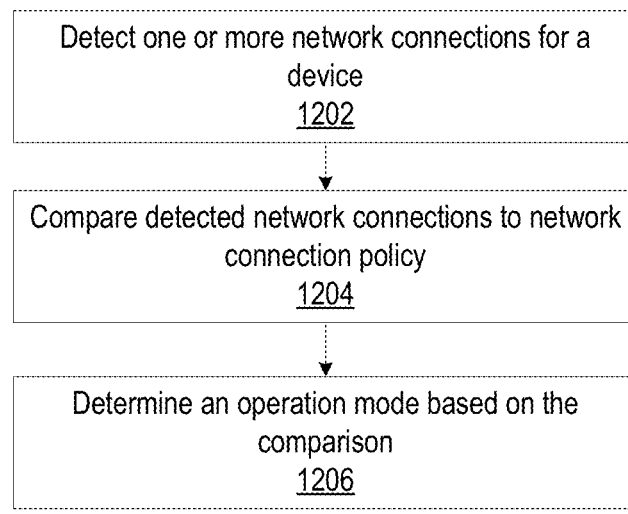
FIG. 12 is a flowchart for determining a network connection context for an application in accordance with an illustrative embodiment.

The method of FIG. 12 may begin at step 1202, one or more network connections are detected. For example, a mobile device, such as mobile device 502, may implement the method of FIG. 12, and the network connections that the mobile device makes may be detected. In an example, network connections may comprise a connection to a cellular network, a connection to a WIFI network, or a connection to a Wireless Local Area Network (WLAN), or the like. The one or more network connections may comprise a context for the selected application.

The method of FIG. 12 may proceed from step 1202 to step 1204, where detected network connections are compared against a network connection policy. For example, a policy may define that a selected application run in managed mode when a mobile device is connected to an internal network, such as a WLAN internal to a company, and that the selected application run in unmanaged mode when the mobile device is only connected to a wireless network, such as cellular network or WIFI network. The method of FIG. 12 may proceed from step 1204 to step 1206, where an operation mode is determined based on the comparison.

Figure 13:
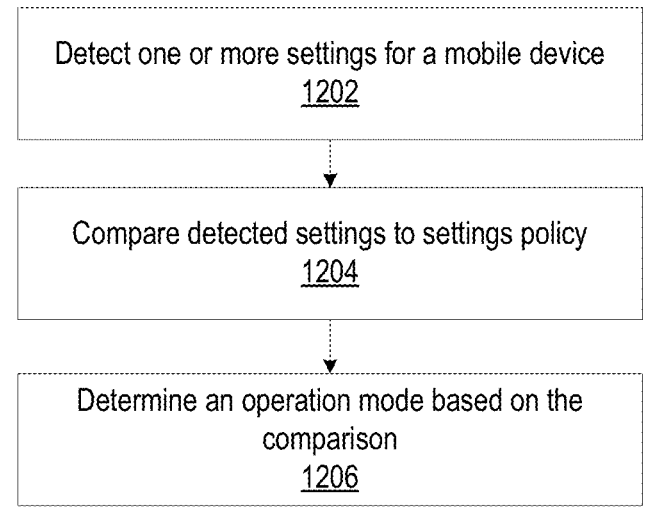
FIG. 13 is a flowchart for determining a settings context for an application in accordance with an illustrative embodiment.

The method of FIG. 13 may begin at step 1302, where one or more settings for a mobile device are detected. For example, a mobile device, such as mobile device 502, may implement the method of FIG. 13, and one or more settings for the mobile device may be detected. In an example, it may be detected whether the mobile device has a lock screen, such as a PIN required for using the mobile device, or it may be detected whether the mobile device is jailbroken/rooted, e.g., has received after-market modifications. The one or more settings may comprise a context for the selected application.

The method of FIG. 13 may proceed from step 1302 to step 1304, where detected settings are compared against a settings policy. For example, a policy may define that a selected application might not run in managed mode if the mobile device does not have a lock screen or if the mobile device is jailbroken/rooted. The method of FIG. 13 may proceed from step 1304 to step 1306, where an operation mode is determined based on the comparison. In an embodiment, when running the selected application in the determined mode, an indicator may be displayed on the mobile device that informs a user of certain policies, such as a requirement for a mobile device to have a lock screen before the mobile device is allowed to run the selected application in managed mode. FIGS. 9-13 describe a plurality of contexts, and any other suitable context and corresponding policy may be implemented.

In an embodiment, one or more of the contexts described in FIGS. 9-13 may be combined and these contexts may be compared against a policy for the selected application. For example, contexts for a selected application may comprise an account type to be accessed as an enterprise email account and a detected network connection as a cellular network. In this example, the policy may define that when an enterprise account is attempted to be accessed over a cellular network, the selected application should be run in managed mode. The policy may be defined in this way because the selected application may encrypt the communication with the enterprise email account, and therefore the risk of sending secure traffic over a cellular network may be mitigated.

In another example, contexts for a selected application may comprise a determined location outside of the United States and a network connection with a WLAN internal to a company. A policy may define that a selected application is to run in managed mode when a determined location is outside the United States and a network connection is with a WLAN internal to a company. The policy may be defined in this way because a network connection with a WLAN internal to a company mitigates the risk associated with secure communications outside of the United States.

In an embodiment, the one or more contexts as described in FIGS. 9-13 may include a priority. For example, a context for a selected application may comprise a determination that the mobile device is jailbroken/rooted, and a policy may define that a selected application is to run only in unmanaged mode when a context indicates a jailbroken/rooted mobile device, regardless of what other contexts indicate. Accordingly, a jailbroken/rooted mobile device will have a selected application run in unmanaged mode even when the mobile device is connected to a WLAN internal to a company or if the selected application is attempting to access an enterprise account.

In an embodiment, a policy may indicate that a selected application is to be run in a less secure managed mode based on a plurality of contexts as described in FIGS. 9-13. For example, contexts for a selected application may comprise an account type to be accessed as an enterprise email account and a detected network connection as a cellular network. In this example, the policy may define that when an enterprise account is attempted to be accessed over a cellular network, the selected application should be run in the less secure managed mode. The less secure managed mode may encrypt communication to and from the selected application, but might not allow access to enterprise resources, such as resources 504. The policy may be defined in this way because the encrypted communication with the enterprise email account may be a low risk communication, and allowing access to enterprise resources may be a high risk communication.

Figure 14:
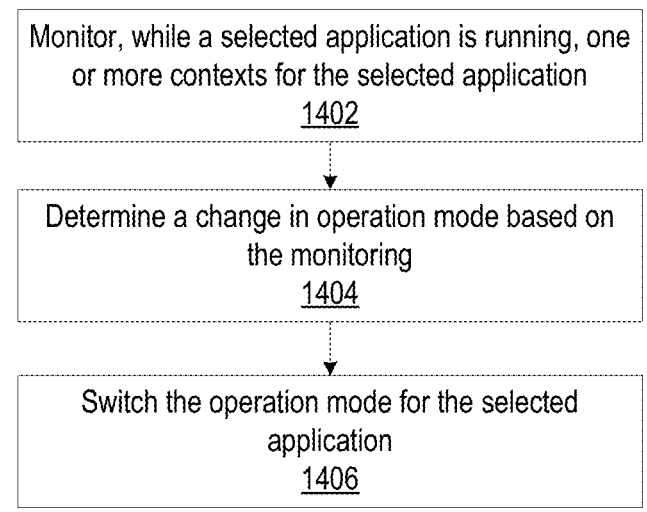
FIG. 14 is a flowchart for switching an application mode for an application in accordance with an illustrative embodiment.

In FIG. 14, a flowchart of example method steps for switching an operation mode for an application is shown. For example, the method steps of FIG. 14 may follow the method steps of FIG. 8. The method of FIG. 14 may begin at step 1402, where one or more contexts may be monitored while a selected application is running. In an embodiment, one or more of the contexts described with reference to FIGS. 9-13 may be monitored. For example, a mobile device running a selected application may be connected to a cellular network and while the selected application is running, the mobile device may make a new network connection with a WLAN internal to a company.

The method of FIG. 14 may proceed from step 1402 to step 1404, where a change in an operation mode for a selected application is detected based on the monitoring. Stated differently, the mobile device may detect a change in information that formed the basis for selecting a particular operational mode. For example, a selected application may be running in unmanaged mode, and once a mobile application running the selected application connects to a WLAN internal to a company, a policy may define that the operation mode for the selected application should switch to managed mode. The method of FIG. 14 may proceed from step 1404 to step 1406, where the operation mode for the selected application is switched.

In an embodiment, a manager, such as a mobile device manager, may manage one or more mobile devices. In this example, the mobile device may be referred to as an enrolled device. In an embodiment, a mobile device may be managed based on software installed on the a managed, such as a client agent 604 of FIG. 6.

In an example, client agent 604 may further include a connection management software development kit (SDK), a connection manager 520, a connection/status application programming interface (API), a set of virtualization services, a runtime SDK, a platform SDK, and a client core.

The virtualization service in the client agent architecture may include, for example, a graphics service, a desktop integration service, a multimedia service, input/output services, a smart card service, a printing service, and the like. The runtime SDK may be, for example, Independent Computing Architecture (ICA) runtime SDK, including an ICA engine. The platform SDK may be, for example, an ICA platform SDK or other platform SDK, and may include various subcomponents such as a virtual channel SDK, a configuration and load manager, a trace subcomponent, a platform abstraction SDK, and the like. The client core may include, for example, a core protocol for remote access to terminal services (e.g., a Winstation driver with a core ICA protocol), a reducer subcomponent configured to perform compression and prioritization, a multi-stream ICA, a TCP stack with session reliability, proxy, and SSL, and a UDP subcomponent. The client core also may include implementations of platform-specific subcomponents, such as graphics smart card and thread support, configuration and load manager libraries, an SSL SDK, and the like.

A mobile device may be enrolled in an enterprise system using, for example, client agent 604. For example, in an enrolled client device 602, a client agent 604 may interact with a gateway server 606 or other access gateway to access various enterprise resources 608 and services 609. Enrolling a device may involve bring your own device (BYOD) and related technologies, and opting in to an MDM or similar system. Enrollment of a device with a company account (or other organization account) may involve pushing certificates to the device and registering the device with a device management server of an enterprise system. After enrollment, the device may be "governed" by a company administrator (or other organization administrator) using mobile device management (MDM) and/or mobile device experience technology (Application management framework) policies that are pushed to the device. Enrolled devices may also be referred to as managed devices. Stated differently, after enrollment, a device may become a managed device as described herein. In certain examples, to enroll a device in an enterprise system, a client agent 604 and/or an application enrollment token may be downloaded and installed on the device. The application enrollment token may be derived from a certificate of a company or other organization to which the device will be enrolled. After downloading the client agent 604 and application enrollment token, the device user may be prompted to open the token and add the company account (or other organization account) to the device.

In an embodiment, an enrolled mobile device, such as mobile device 502 of FIG. 5, may be managed by a service, such as device manager 524 of FIG. 5. Device manager 524 may provide services that include configuration, provisioning, security, support, monitoring, reporting, and decommissioning. For example, device manager 524 may monitor what applications are installed on an enrolled/managed mobile device. In this example, device manager 524 may store/access a list of black-listed applications and may further determine the installation of a black-listed application on an enrolled/managed mobile device. A black-listed application may comprise an application that is suspected malware or any other suitable application. In another example, device manager 524 may monitor an operating state for an enrolled mobile device. In this example, device manager 524 may determine that an enrolled mobile device has been jailbroken/rooted. Device manager 524 may perform various management activities on an enrolled device based on these determinations.

In another example, device manager 524 may monitor a network connection for the mobile device. In this example, device manager 524 may determine that an enrolled mobile device is connected to a cellular network, a wireless local area network (WLAN), a local area network (LAN), a combination of these, or any other suitable network. In another example, device manager 524 may monitor a location for the mobile device. In this example, device manager 524 may determine the geographic location for the mobile device, such as the latitude and longitude, the country, the state, any suitable region, or any other suitable location for the mobile device.

In another example, device manager 524 may monitor whether a particular application is running on the mobile device. In this example, device manager 524 may determine whether the particular application, such as client agent 604 of FIG. 6, is running on the mobile device. Device manager 524 may perform various management activities on an enrolled device based on these determinations.

In an embodiment, an application installed on an enrolled mobile device may run in managed mode or unmanaged mode, as described above. In an embodiment, a managed operation mode may include running the application as a part of the managed partition 510 of mobile device 502, as described above with reference to FIG. 5. In an embodiment, an application running in managed mode may access data stored in a secure data container 528 in the managed partition 510 of the mobile device. The data stored in the secure data container 528 may include data restricted to a specific secure application 530, shared among other secure applications, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. Other types of encryption may be used, and other levels and types of security measures may be applied based on a desired level and/or type of security, as well as different key recovery features. In an embodiment, an application running in managed mode may save, modify, or delete data in secure data container 528. The data saved or modified may be encrypted similar to other data stored in secure data container 528.

In an embodiment, a managed mode may comprise an enterprise mode and an unmanaged mode may comprise a personal mode. For example, when the application is running in managed mode, or enterprise mode, the application may have access to resources stored on a secure server (e.g., enterprise data). A device manager 524 managing the device may be associated with an enterprise. In this example, the application running in managed mode may be able to communicate with one or more servers (e.g., gateway server 606) that grant the application access to enterprise data. When the application is running in unmanaged mode, or personal mode, the application may not have access to the enterprise data.

Figure 15:
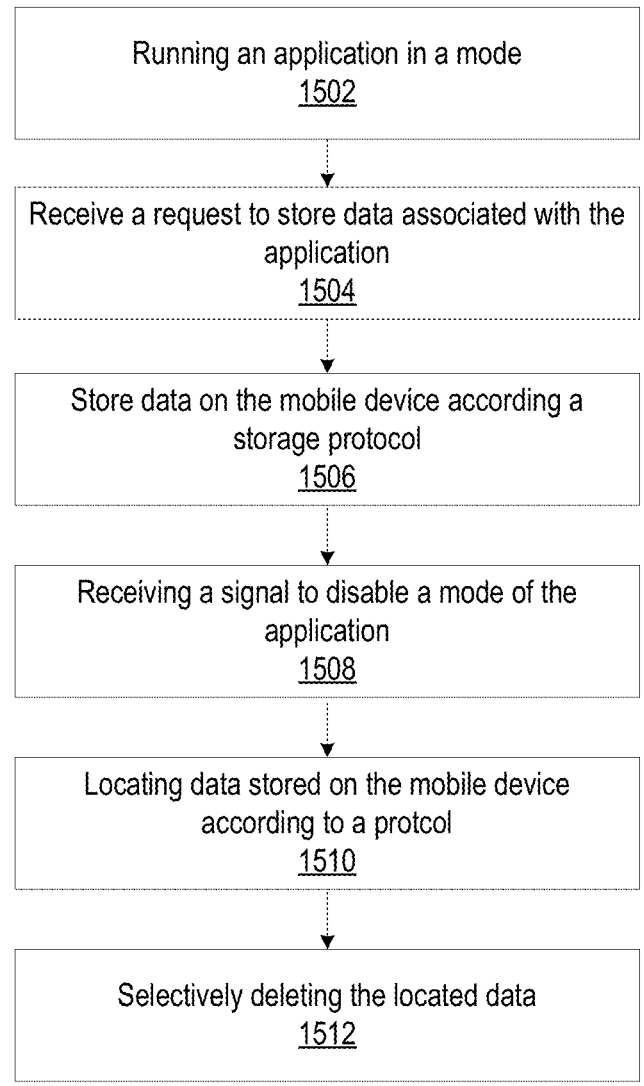
FIG. 15 is a flowchart for managing an application with multiple operation modes in accordance with an illustrative embodiment.

In an embodiment, an application that is capable of running in managed mode or unmanaged mode may leverage storage policies for storing data associated with the application. In FIG. 15, a flowchart of example method steps for managing an application that runs in multiple modes is shown. FIG. 15 may begin at step 1502, where an application runs on a mobile device in one of managed mode or unmanaged mode. For example, an application capable of running in managed mode or unmanaged mode, as described above, may run in one of these modes.

The process of FIG. 15 may proceed from step 1502 to step 1504, where a request is received to store data associated with the application. For example, when the application is running in managed mode, a request may be received to store data, such as secured data accessed from a secured server (e.g., gateway server 606). In such an example, the secured data may comprise enterprise data, as described above. In another example, when the application is running in unmanaged mode, a request may be received to store data, such as personal data.

The process of FIG. 15 may proceed from step 1504 to step 1506, where data is stored on the mobile device according to a storage protocol. A storage protocol may define the manner in which the requested data is to be stored on the mobile device. For example, when the application is running in managed mode, the data may be stored according to a first protocol, and when the application is running in unmanaged mode, the data may be stored according to a second protocol.

In an embodiment, the first storage protocol may define that the requested data may be stored in a first data container, such as a secured data container (e.g., secured data container 528). In this example, the data stored in the first data container may not be accessible to the application while the application is running in unmanaged mode. In an embodiment, the second storage protocol may define that the requested data may be stored in a second data container different from the first data container. The second data container may comprise a general data container that stores, for example, personal data.

In an embodiment, the first storage protocol may define that the requested data may be encrypted prior to storage. In this example, the data may be encrypted using a first key and, in some embodiments, the first key may be associated with a device manager that manages the device (e.g., device manager 524). In an embodiment, the second storage protocol may define that the requested data may be encrypted prior to storage using a second key different from the first key. In another example, the first storage protocol may define that the requested data may be stored unencrypted.

Stored data may be automatically updated when a storage protocol changes or is modified. For example, a policy may be updated that changes the encryption scheme used for data storage from a first type of encryption to a second type of encryption. When this occurs, the mobile device may automatically decrypt the stored data based on the first type of encryption and re-encrypt the stored data based on the second type of encryption using the new or revised policy. In this manner stored data may always be kept compliant with a current storage policy.

In an embodiment, the first storage protocol may define that the requested data may be stored in association with a managed account. The application running in managed mode may be associated with a managed account. For example, a cloud storage application that, while running in managed mode, allows access to secured data may be associated with a managed account used to gain access to the secured data. The requested data may be stored in association with this managed account. In an embodiment, the first storage protocol may define that the requested data stored may be managed by device manager 524.

Accordingly, while the application is running in managed mode, data may be stored according to the first protocol, as described above. While the application is running in unmanaged mode, data may be stored according to the second protocol, as described above.

In some embodiments, the type and/or location of storage may be dependent on the operation mode in use. For example a storage protocol or policy may specify that data is to be stored in cloud-based storage. The storage protocol or policy may further specify that either enterprise or non-enterprise cloud storage should be used, based on operation mode. When in managed mode, data may be saved to an enterprise or other cloud storage where a predefined level of security is provided, as selected by the enterprise or policy. Alternatively, when in unmanaged mode, data may be saved or stored in a less secure cloud storage service or location, e.g., as selected by the user. Illustrative embodiments may include hybrid storage policies wherein based on certain circumstances of the mobile device or application, data may be stored locally when an app is running unmanaged and data may be stored in cloud storage when the app is running in managed mode, or vice versa.

The process of FIG. 15 may proceed from step 1506 to step 1508, where a signal is received to disable a mode of the application. For example, a signal may be received to disable the managed mode of the application. In an embodiment, device manager 524 may monitor an enrolled mobile device, detect a state for the mobile device, and send a signal to disable a managed mode of an application installed on the mobile device. For example, device manager 524 may detect that an enrolled mobile device is jailbroken/rooted, and may determine to disable the managed mode of the application based on the detection. In another embodiment, device manager 524 may detect that a black listed application has been installed on an enrolled mobile device, and may determine to disable the managed mode of the application based on the detection.

In another embodiment, device manager 524 may detect that a managed account associated with the application has expired or has been deleted, and may determine to disable the managed mode of the application based on the detection. For example, a cloud storage application that, while running in managed mode, allows access to secured data may be associated with a managed account used to gain access to the secured data. Device manager 524 may detect that the managed account has expired or has been deleted and may send a signal to disable the managed mode of the cloud storage application based on the detection. In an embodiment, when a signal to disable a managed mode of the application is received, the application may be converted into an application that does not run in managed mode.

In an embodiment, based on the received signal to disable a managed mode of an application, it may be determined that data stored according to a first protocol is to be selectively deleted. For example, data stored according to a first protocol may be associated with the managed mode that is to be disabled, and the data stored according to the first protocol may be selectively deleted as a part of disabling the managed mode.

The process of FIG. 15 may proceed from step 1508 to step 1510, where data stored on the mobile device according to a protocol is located. For example, device manager 524 may monitor an enrolled mobile device and locate data that is stored according to a first protocol. The data stored according to the first protocol may comprise data associated with a particular application running in a first mode, such as an application running in a managed mode. In an embodiment, the located data may comprise enterprise data for the application.

In an embodiment, the data stored according to the first protocol may be located based on an account. For example, an account may be associated with a managed account. An application may run in managed mode and stored data may be associated with the managed account. In this embodiment, the data stored according to the first protocol may be associated with the managed account, and the data stored according to the first protocol may be located based on the managed account.

In another embodiment, the data stored according to the first protocol may be located based on a storage container. For example, a secure storage container, such as secure data container 528 of FIG. 5, may be associated with data stored according to the first protocol. An application may run in managed mode and data stored according to the first protocol may be stored in the secure data container. In this embodiment, the data stored according to the first protocol may be stored in the secure data container, and the data stored according to the first protocol may be located based on the storage in the secure storage container.

In another embodiment, the data stored according to the first protocol may be located based on an encryption. For example, data stored according to the first protocol may be encrypted using a particular encryption, such as an encryption using a first key. An application may run in managed mode and data stored according to the first protocol may be encrypted based on the particular encryption. In this embodiment, the data stored according to the first protocol may be located based the encryption for the data. In an example, the first key may be associated with device manager 524.

The process of FIG. 15 may proceed from step 1510 to step 1512, where the located data is selectively deleted. For example, device manager 524 may monitor an enrolled mobile device, locate data stored according to the first protocol on the enrolled mobile device, and selectively delete the located data. In an embodiment, selectively deleting the located data does not delete any other data stored on the mobile device. For example, where the located data comprises enterprise data for an application, the personal data for the application might not be deleted. Alternatively, access to data stored according to the first protocol may be locked or blocked until the device reenrolls or the application is capable of again running in managed mode.

Figure 16:
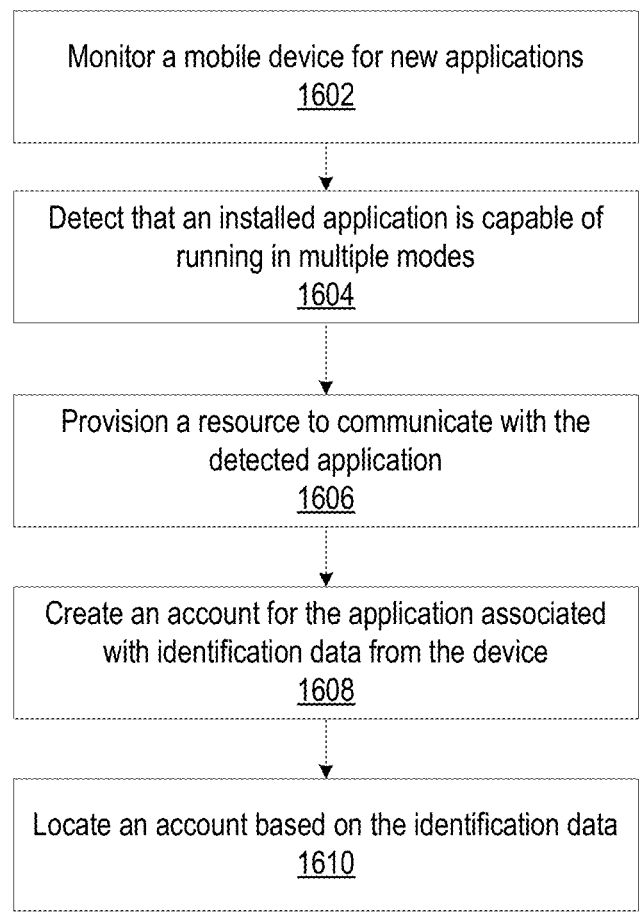
FIG. 16 is a flowchart for managing a multi-mode application in accordance with an illustrative embodiment.

In FIG. 16, a flowchart of example method steps for managing an account for an application capable of executing in multiple modes is shown. The process of FIG. 16 may be used upon detection that an installed application is capable of executing in multiple modes to configure access to enterprise resources by the application executing in a managed mode. In addition, resources may be pre-provisioned based on certain events (e.g., a new employee starts with a company, and resources are pre-provisioned as part of the new employee procedures), thereby speeding up first time execution of managed apps. FIG. 16 may begin at step 1602, where a mobile device is monitored for new applications. For example, device manager 524 may monitor an enrolled mobile device, such as mobile device 502, as described above. The device manager may monitor the installed applications on the mobile device. In an embodiment, the device manager may periodically monitor the mobile device for the installation of new applications.

The process of FIG. 16 may proceed from step 1602 to step 1604, where it is detected that an application capable of running in a managed mode and an unmanaged mode is installed on the mobile device. For example, device manager 524 may monitor an enrolled mobile device and determine that an application capable of running in a managed mode and an unmanaged mode is installed on the mobile device. The device manager may detect that the installed application is capable of running in a managed mode and an unmanaged mode based on meta-data associated with the application or based on any other suitable detection manner.

The process of FIG. 16 may proceed from step 1604 to step 1606, where a resource is provisioned to communicate with the detected application. For example, a resource, such as a gateway server (e.g., gateway server 560) may be provisioned to communicate with the detected application when the application is running in managed mode.

In an embodiment, the resource may comprise a cloud storage resource. The cloud storage resource may store secure data, such as enterprise data. In this example, the cloud storage resource may be provisioned to communicate with the detected application running in managed mode such that the detected application running in managed mode may access the secure data stored in the cloud storage resource after provisioning.

In an embodiment, provisioning the resource may comprise creating an account for the application. In such an embodiment, the process of FIG. 16 may proceed from step 1604 to step 1606, where an account is created for the application that is associated with identification information from the mobile device. For example, an enrolled mobile device may have identification information associated with the mobile device and/or associated with a user of the mobile device. In an embodiment, the identification information may comprise an enterprise credential, such as a login and password for an active directory for an enterprise. In another embodiment, the identification information may comprise a token associated with an enterprise. For example, an enrolled mobile device may receive a token, such as a Security Assertion Markup Language (SAML) token or any other suitable token, from an enterprise server that identifies the enrolled mobile device and/or a user for the enrolled mobile device. The identification information may comprise any other suitable identification information. The device manager (e.g., device manager 524) may access the identification on the mobile device, such as a token, or the mobile device may provide the identification information.

In an embodiment, an account may be created for the application capable of executing in managed mode and unmanaged mode that is associated with the identification information. In this example, the identification information may comprise user credentials, for example enterprise credentials, a token, or any other suitable identification information. In an embodiment, an account may be created based on a determination that an account associated with the identification information does not already exist for the application. For example, a server may search for an account for the application based on the identification information and an account may be created based on the server failing to find an account.

In an embodiment, the created account may be associated with the resource being configured to communicate with the application running in managed mode. For example, a created account may be associated with a cloud storage resource being configured to communicate with the application running in managed mode may.

The process of FIG. 16 may proceed from step 1606 to step 1608, where an account may be identified based on the identification information. For example, an account for a user, such as a user associated with an enterprise, may be identified based on the identification information, such as credentials for the user. The identified account may comprise an enterprise active directory account, an account affiliated with enterprise resource rights, or any other suitable enterprise account. In an embodiment, enterprise resources may be accessed on an enrolled mobile device by signing onto to the identified accounts, as described above.

The process of FIG. 16 may proceed from step 1608 to step 1610, where the created account may be linked with the identified account. For example, an account created for an application capable of running in managed mode and unmanaged mode may be linked with an enterprise account, such as an active directory account. Using the link, the application running in managed mode may be able to access system resources based on access rights for the identified account. For example, where the resource being configured to communicate with the application running in managed mode comprises a cloud storage resource, the application running in managed mode may access secure data in the cloud storage resourced based on the link.

In an embodiment, after an account is created for the application capable of running in managed mode according to FIG. 16, the application may access secure data based on the created account. For example, a user may login to the created account using the application running in managed mode and credentials for the user, such as a login and password or a token. A server, such as gateway server 560, may permit the application running in managed mode to login to the created account based on the provided credentials for the user. The application may request access to enterprise data, such as email for the user or secure documents. The server may permit access to the application based on the linked account. For example, the linked account may comprise an active directory account and/or an account that comprises access rights for the user. The application may be permitted to access enterprise data according to access rights comprises in the linked account.

In an embodiment, the application may comprise a bring your own application and device manager 524 may alter and/or configure the application. For example, the alteration and/or configuration may comprise adjusting the application such that the application may be run in managed mode. For instance, an application may be altered and/or configured such that the data stored by the application while it is running in managed mode is encrypted or is stored in a secure data container. In another example, an application may be altered and/or configured such that the application while it is running in managed mode may communicate with one or more secure resources (e.g., gateway server 560). In this example, the secure resource may comprise a cloud storage resource that has been provisioned to communicate with the application running in managed mode, as described above.

In an embodiment, an application store may provide an application capable of being executed in multiple operations modes. An application store may provide downloadable applications to mobile devices. For example, a mobile device may request a list of downloadable applications, and the application store may provide the requested list. The mobile device may then download one of the listed applications from the application store and install the downloaded application.

In an embodiment, an application store may provide a plurality of versions of an application and may provide a version that is capable of running in multiple operation modes. For example, an application store may provide a version of an application that is capable of running in managed mode or unmanaged mode, as described above.

Figure 17:
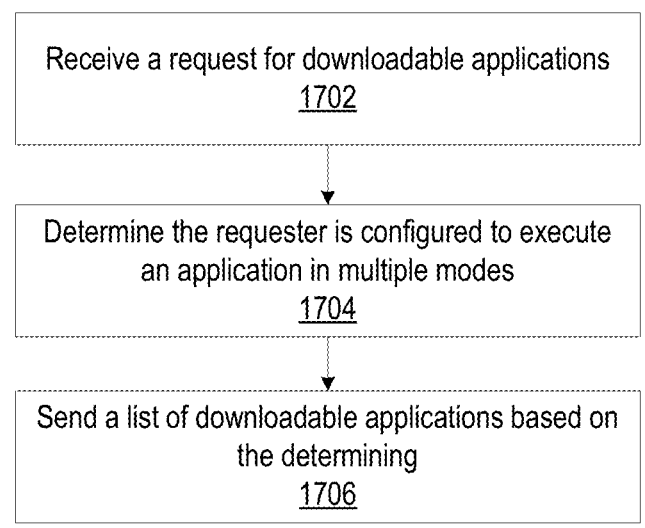
FIG. 17 is a flowchart for an app store in accordance with an illustrative embodiment.

In FIG. 17, a flowchart of example method steps for providing a downloadable application capable of executing in multiple modes is shown according to an embodiment. FIG. 17 may begin at step 1702, where a request is received for downloadable applications. For example, a mobile device, such as mobile device 502, may request a list of downloadable applications from the application store.

The process of FIG. 17 may proceed from step 1702 to step 1704, where it is determined whether the mobile device is configured to execute an application in multiple modes. For example, it may be determined whether the mobile device is configured to execute an application in managed mode and in unmanaged mode.

In an embodiment, it may be determined whether the mobile device is configured with an application management framework capable of executing an application in managed mode and unmanaged mode. It may be determined whether the mobile device is configured with an application management framework such as application management framework 614.

In an embodiment, determining whether the mobile device is configured with an application management framework capable of executing an application in managed mode and unmanaged mode may comprise detecting that a managed application associated with an application management framework is installed on the mobile device. For example, it may be detected whether a managed application, such as client agent 604, that is associated with an application management framework, such as application management framework 614, is installed on the mobile device. Detecting that an application such as client agent 604 is installed on the mobile device may allow a determination that the mobile device is configured with an application management framework capable of executing an application in managed mode and unmanaged mode.

In an embodiment, determining whether the mobile device is configured with an application management framework capable of executing an application in managed mode and unmanaged mode may comprise detecting that the mobile device is managed by a device manager associated with the application management framework. For example, it may be detected whether a device manager, such as device manager 524, that is associated with an application management framework, such as application management framework 614, manages the mobile device. Detecting that a device manager such as device manager 524 manages the mobile device may allow a determination that the mobile device is configured with an application management framework capable of executing an application in managed mode and unmanaged mode.

The process of FIG. 17 may proceed from step 1704 to step 1706, where a list of downloadable applications may be sent to the mobile device based on the determining. For example, when the mobile device is determined to be configured with an application management framework that is capable of executing an application in managed mode and unmanaged mode, a list of downloadable applications may be provided that includes a first version of an application executable in both managed mode and unmanaged mode. In another example, when the mobile device is determined not to be configured with an application management framework that is capable of executing an application in managed mode and unmanaged mode, a list of downloadable applications may be provided that excludes the first version of an application executable in both managed mode and unmanaged mode. For instance, the application may comprise a file sharing application and a first version of the file sharing application may comprise an application that is executable in both managed mode and unmanaged mode, as described above.

In an embodiment, the first version of the application executable in both managed mode and unmanaged mode may be associated with the application management framework on the mobile device, such as application management framework 614. The first version of the application may be selected based on the association with the application management framework implemented by the mobile device. For example, the application store may comprise a plurality of versions of the application executable in managed mode and unmanaged mode, and the first version of the application may be selected for listing because the first version is configured for execution and/or management by the application management framework. By selecting the appropriate version of an application based on the application management framework of a given mobile device, a single application store may provide applications to a wide array of mobile devices regardless of the application management framework implemented by a device. As such, each application management framework provider need not maintain a dedicate application store and application developers can simply supply one or more versions of an application to a single application store for distribution.

In an embodiment, the first version of the application executable in both unmanaged mode and managed mode may be associated with a device manager that manages the mobile device, such as device manager 524. The first version of the application may be selected based on the association with the device manager. For example, the application store may comprise a plurality of versions of the application executable in managed mode and unmanaged mode, and the first version of the application may be selected for listing based on an association with the device manager that manages the mobile device.

In an embodiment, based on the list of downloadable applications, the mobile device may download and install an application. For example, in an embodiment where the list comprises a version of an application executable in managed mode and unmanaged mode, the mobile may download the version of the application and install the version of the application. The mobile device may then execute the installed application in managed mode or in unmanaged mode.

In another embodiment, an application installed on an enrolled mobile device may comprise an external application. For example, an enrolled mobile device may receive an application from an external source unaffiliated with a device manager for the mobile device (e.g., device manger 524), such as a general application store, rather than an enterprise source affiliated with a device manager for the enrolled mobile device (e.g. device manager 524), such as an enterprise application store. In an embodiment, the external application may comprise a general application that is not associated with an enterprise application store.

In an embodiment, the external application may request to sign on to an enterprise account and/or an enterprise server. An enterprise account may comprise an account associated with an enterprise, such as an account associated with an active directory for an enterprise. For example, the external application may comprise an email client, and the email client may request to sign on to an enterprise email account. In another example, the external application may comprise a cloud storage application, and the cloud storage application may request to sign on to a server that allows access to enterprise resources, such as a gateway server.

In an embodiment, an enrolled mobile device, such as enrolled mobile device 502 of FIG. 5, may have an external application installed, and the external application may submit a request to a server, such as gateway server 560 of FIG. 5, to access an enterprise account. This may comprise an example of a bring your own application (BYOA) embodiment.

In an embodiment, a bring your own application installed on a managed mobile device may be altered and/or configured by a device manager managing the mobile device. For example, a bring your own application installed on mobile device 502 may be altered by device manager 524. The alteration and/or configuration may comprise adjusting the application such that the application may be run in managed mode. For instance, an application may be altered and/or configured such that the data stored by the application while it is running in managed mode is encrypted or is stored in a secure data container. In another example, an application may be altered and/or configured such that the application while it is running in managed mode may communicate with one or more secure resources (e.g., gateway server 560).

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims, and other embodiments may be practiced. For example, various other embodiments include, but are not limited to, the following.

One embodiment may include a method comprising: running, on a mobile device, an application in a first mode, wherein the first mode is a managed mode; running, on the mobile device, the application in a second mode, wherein the second mode is an unmanaged mode, wherein said application is running in the second mode at a mutually exclusive time from when said application is running in the first mode; receiving a request to store data associated with the application; storing the data according to a first protocol when the application is running in the managed mode and storing the data according to a second protocol when the application is running in the unmanaged mode. In such an embodiment, the first protocol may comprise storing data in a first data container and the second protocol may comprise storing data in a second data container mutually exclusive from the first data container. Such an embodiment may further comprise restricting the application from accessing the first data container when running in the unmanaged mode. Such an embodiment may further include the first protocol comprising encrypting data with a first key prior to storing that data and the second protocol comprising at least one of encrypting data with a second key prior to storing the data and storing data unencrypted. In some cases, the application running in the managed mode is managed by a device manager in accordance with one or more policy files separate from the application and applicable to a plurality of applications. Some aspects may also include receiving a signal from the device manager to disable the managed mode of the application. When that happens, the embodiment may locate, in response to the received signal, data stored according to the first protocol, and selectively delete the located data. Locating the data stored according to the first protocol may include determining a managed account associated with the application, and locating the data based on the managed account. In some cases, locating data stored according to the first protocol further comprises locating a container that stores data according to the first protocol. In some aspects, locating data stored according to the first protocol further comprises determining an encryption key associated with the first protocol; and locating the data based on the determined encryption key. In some embodiment, the device manager disables the managed mode in response to identifying a black listed application installed on the mobile device. The device manager may disable the managed mode in response to detecting that a managed account associated with the application has expired. The device manager may disable the managed mode in response to detecting that the mobile device has been jailbroken or rooted. In some cases, selectively deleting the located data does not delete personal data associated with the application stored on the mobile device.

Another embodiment may include a computing device comprising a processor, wherein the computing device is configured to run an application in a first mode, wherein the first mode is a managed mode operating under the control of one or more policy files separate from the application and usable to manage operations of multiple applications executing on the computing device; run the application in a second mode, wherein said application is running in the second mode at a mutually exclusive time from when said application is running in the first mode; receive a request to store data associated with the application; and store the data according to a first protocol when the application is running in the first mode and store the data according to a second protocol when the application is running in the second mode. In some aspect the first protocol comprises storing data in a first data container and the second protocol comprises storing data in a second data container different from the first data container. In some embodiments the computing device is further configured to restrict the application from accessing the first data container when running in the second mode. In some embodiments the first protocol comprises encrypting data with a first key prior to storing that data and the second protocol comprises at least one of encrypting data with a second key prior to storing the data and storing data unencrypted. In some embodiments the first mode is a first managed mode, and the second mode is a second managed mode managed in accordance with at least one different policy file than the first managed mode.

Yet another embodiment may include one or more non-transitory computer-readable storage media storing computer-executable instructions that, when executed by one or more processors of a data processing system, cause the system to: run an application in a first mode, wherein the first mode is a managed mode; run the application in a second mode, wherein the second mode is an unmanaged mode, wherein said application is running in the second mode at a mutually exclusive time from when said application is running in the first mode; receive a request to store data associated with the application; store the data according to a first protocol when the application is running in the managed mode and store the data according to a second protocol when the application is running in the unmanaged mode.

In another illustrative embodiment, a method may include periodically monitoring a mobile device to determine that a new software application is installed on the mobile device; detecting that the application is capable of running in both a first mode and a second mode, wherein the first mode is a managed mode operating under the control of one or more policy files separate from the application and usable to manage operations of multiple applications executing on the computing device; provisioning a resource to communicate with the application such that the resource is configured only to communicate with the application when the application is running in the first mode, and not to communicate with the application when the application is running in the second mode. In some aspects the resource comprises a cloud storage resource that stores secure data. In some aspects provisioning the resource comprises provisioning the cloud data storage resource to allow the application to access secure data stored in the cloud data storage resource while the application is running in the first mode. In some aspects the mobile device is managed by a device manager, and wherein the device manager administers the one or more policy files. In some aspects provisioning the resource further comprises creating an account with the resource for the application associated with identification information from the mobile device; locating a managed account based on the identification information; and linking the managed account to the created account. In some aspects the second mode is a second managed mode operating under the control of one or more policy files different from the first mode. In some aspects the first mode is associated with a first user role, and the second mode is associated with a second user role different from the first user role. In some aspects the first mode is associated with a first workplace environment type, and the second mode is associated with a second workplace environment type. In some aspects the method includes detecting that the application is running in the first mode; and allowing the application to access secure data based on the created account. In some aspects the method includes receiving a request from the application running in the first mode, wherein the request comprises a request to access secure data; and granting the application access to the secure data based on the created account. In some aspects the application is distributed by an enterprise to the device.

In another illustrative embodiment, a device with a processor is configured to: periodically monitor a mobile device to determine that a new software application is installed on the mobile device; detect that the application is capable of running in both a first mode and a second mode, wherein the first mode is a managed mode operating under the control of one or more policy files separate from the application and usable to manage operations of multiple applications executing on the computing device; provision a resource to communicate with the application such that the resource is configured only to communicate with the application when the application is running in the first mode, and not to communicate with the application when the application is running in the second mode. In some aspects, the resource comprises a cloud storage resource that stores secure data. In some aspects provisioning the resource comprises provisioning the cloud data storage resource to allow the application to access secure data stored in the cloud data storage resource while the application is running in the first mode. In some aspects the mobile device is managed by a device manager, wherein the device manager administers the one or more policy files. In some aspects provisioning the resource further comprises: creating an account with the resource for the application associated with identification information from the mobile device; locating a managed account based on the identification information; and linking the managed account to the created account. In some aspects the second mode is a second managed mode operating under the control of one or more policy files different from the first mode. In some aspects the first mode is associated with a first user role, and the second mode is associated with a second user role. In some aspects the device further is configured to: detect that the application is running in the first mode; and allow the application to access secure data based on the created account.

In another illustrative embodiment, one or more non-transitory computer-readable storage media store computer-executable instructions that, when executed by one or more processors of a data processing system, cause the system to perform: periodically monitoring a mobile device to determine that a new software application is installed on the mobile device; detecting that the application is capable of running in both a first mode and a second mode, wherein the first mode is a managed mode operating under the control of one or more policy files separate from the application and usable to manage operations of multiple applications executing on the computing device; and provisioning a resource to communicate with the application such that the resource is configured only to communicate with the application when the application is running in the first mode, and not to communicate with the application when the application is running in the second mode.

What is claimed is:

1. A method comprising: running, on a mobile device, an application in a first mode, wherein the first mode is a managed mode and is managed by a device manager in accordance with one or more policy files separate from the application and applicable to a plurality of applications; running, on the mobile device, the application in a second mode, wherein the second mode is an unmanaged mode, wherein said application is running in the second mode at a mutually exclusive time from when said application is running in the first mode; receiving a request to store data associated with the application; storing the data according to a first protocol when the application is running in the managed mode and storing the data according to a second protocol when the application is running in the unmanaged mode; receiving a signal from the device manager to disable the managed mode of the application; locating, in response to the received signal, data stored according to the first protocol; and selectively deleting the located data.

2. The method of claim 1, wherein the first protocol comprises storing data in a first data container and the second protocol comprises storing data in a second data container mutually exclusive from the first data container.

3. The method of claim 2, further comprising restricting the application from accessing the first data container when running in the unmanaged mode.

4. The method of claim 1, wherein the first protocol comprises encrypting data with a first key prior to storing that data and the second protocol comprises at least one of encrypting data with a second key prior to storing the data and storing data unencrypted.

5. The method of claim 1, wherein locating data stored according to the first protocol further comprises: determining a managed account associated with the application; and locating the data based on the managed account.

6. The method of claim 1, wherein locating data stored according to the first protocol further comprises locating a container that stores data according to the first protocol.

7. The method of claim 1, wherein locating data stored according to the first protocol further comprises: determining an encryption key associated with the first protocol; and locating the data based on the determined encryption key.

8. The method of claim 1, wherein the device manager disables the managed mode in response to identifying a black listed application installed on the mobile device.

9. The method of claim 1, wherein the device manager disables the managed mode in response to detecting that a managed account associated with the application has expired.

10. The method of claim 1, wherein the device manager disables the managed mode in response to detecting that the mobile device has been jailbroken or rooted.

11. A method of claim 1, wherein selectively deleting the located data does not delete personal data associated with the application stored on the mobile device.

12. A computing device comprising:
a processor, wherein the computing device is configured to: run an application in a first mode, wherein the first mode is a managed mode operating under the control of one or more policy files separate from the application and usable to manage operations of multiple applications executing on the computing device; run the application in a second mode, wherein said application is running in the second mode at a mutually exclusive time from when said application is running in the first mode; receive a request to store data associated with the application; store the data according to a first protocol when the application is running in the first mode and storing the data according to a second protocol when the application is running in the second mode; receive a signal to disable the first mode of the application; locate, in response to the received signal, data stored according to the first protocol; and selectively delete the located data.

13. The computing device of claim 12, wherein the first protocol comprises storing data in a first data container and the second protocol comprises storing data in a second data container different from the first data container.

14. The computing device of claim 13, wherein the computing device is further configured to:
restrict the application from accessing the first data container when running in the second mode.

15. The computing device of claim 12, wherein the first protocol comprises encrypting data with a first key prior to storing that data and the second protocol comprises at least one of encrypting data with a second key prior to storing the data and storing data unencrypted.

16. The computing device of claim 12, wherein the first mode is a first managed mode, and the second mode is a second managed mode managed in accordance with at least one different policy file than the first managed mode.

17. One or more non-transitory computer-readable storage media storing computer-executable instructions that, when executed by one or more processors of a data processing system, configure the system to:
run an application in a first mode, wherein the first mode is a managed mode operating under the control of one or more policy files separate from the application and usable to manage operations of a plurality of applications; run the application in a second mode, wherein the second mode is an unmanaged mode, wherein said application is running in the second mode at a mutually exclusive time from when said application is running in the first mode; receive a request to store data associated with the application; store the data according to a first protocol when the application is running in the managed mode and storing the data according to a second protocol when the application is running in the unmanaged mode; receive a signal to disable the managed mode of the application; locate, in response to the received signal, data stored according to the first protocol; and selectively delete the located data.

* * * * *